US012467684B2

(12) United States Patent
Defoort et al.

(10) Patent No.: US 12,467,684 B2
(45) Date of Patent: Nov. 11, 2025

(54) BIOMASS DEHYDRATION SYSTEM

(71) Applicant: COLORADO STATE UNIVERSITY RESEARCH FOUNDATION, Fort Collins, CO (US)

(72) Inventors: Morgan Defoort, Fort Collins, CO (US); John Mizia, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 595 days.

(21) Appl. No.: 17/997,443

(22) PCT Filed: Feb. 12, 2021

(86) PCT No.: PCT/US2021/017847

§ 371 (c)(1),
(2) Date: Oct. 28, 2022

(87) PCT Pub. No.: WO2021/221759

PCT Pub. Date: Nov. 4, 2021

(65) Prior Publication Data

US 2023/0168032 A1 Jun. 1, 2023

Related U.S. Application Data

(60) Provisional application No. 63/018,095, filed on Apr. 30, 2020.

(51) Int. Cl.
*F26B 3/04* (2006.01)
*F26B 17/02* (2006.01)
(Continued)

(52) U.S. Cl.
CPC .............. *F26B 3/04* (2013.01); *F26B 17/023* (2013.01); *F26B 23/028* (2013.01);
(Continued)

(58) Field of Classification Search
CPC ........ F26B 3/04; F26B 17/023; F26B 23/028; F26B 25/001; F26B 25/04; F26B 23/04;
(Continued)

(56) References Cited

U.S. PATENT DOCUMENTS 2,501,537 A * 3/1950 Parkes .................... F26B 13/12 34/242
2,632,961 A * 3/1953 Robertson ............... D06F 58/12 34/661

(Continued)

FOREIGN PATENT DOCUMENTS

BR 102012016002 A2 * 4/2015
CN 102331162 B 12/2013
KR 10-1846479 B1 4/2018

OTHER PUBLICATIONS

Translation BR-102012016002-A2 (Year: 2015).*

(Continued)

*Primary Examiner* — Jessica Yuen
(74) *Attorney, Agent, or Firm* — Robinson IP Law, PLLC

(57) ABSTRACT

Various implementations include a biomass dehydration system including a wet biomass chamber containing wet biomass, a belt or chain defining one or more cavities, two or more pulleys including a drive pulley that the belt or chain extend around and that are configured such that the cavities are disposable within the wet biomass chamber as the belt or chain moves along the pulleys to cause wet biomass to enter the cavities, and a drying chamber for dehydrating wet biomass disposed in the cavities into solid pellets. The drive pulley engages the belt or chain and causes the belt or chain to move around the pulleys. At least a portion of the belt or chain extends from the wet biomass chamber through the drying chamber. One of the pulleys includes one or more (Continued)

ejection protrusions for engaging the cavities and ejecting solid pellets from the cavities.

21 Claims, 7 Drawing Sheets

(51) Int. Cl.

| | |
|---|---|
| ***F26B 23/02*** | (2006.01) |
| ***F26B 23/04*** | (2006.01) |
| ***F26B 25/00*** | (2006.01) |
| ***F26B 25/04*** | (2006.01) |

(52) U.S. Cl.
CPC ............ *F26B 25/001* (2013.01); *F26B 25/04* (2013.01); *F26B 23/04* (2013.01); *F26B 2200/02* (2013.01)

(58) Field of Classification Search
CPC .... F26B 2200/02; F26B 17/06; F26B 25/002; Y02E 50/10; Y02E 50/30
See application file for complete search history.

(56) References Cited

U.S. PATENT DOCUMENTS

| | | | |
|---|---|---|---|
| 5,542,962 | A | 8/1996 | Ollerenshaw et al. |
| 9,155,429 | B2 | 10/2015 | Colombot |

OTHER PUBLICATIONS

International Search Report and Written Opinion in International Application No. PCT/US2021/017847, mailed Apr. 22, 2021, 6 pages.

* cited by examiner

BIOMASS DEHYDRATION SYSTEM

CROSS REFERENCE TO RELATED APPLICATIONS

This application is a United States National Phase Patent Application of International Patent Application Number PCT/US2021/017847, filed on Feb. 12, 2021, which claims the benefit of U.S. Provisional Patent Application No. 63,018,095, filed Apr. 30, 2020, the contents of which are incorporated herein by reference in its entirety.

BACKGROUND

The lack of any modern sanitation systems in many developing countries has led to the widespread prevalence of fecal contamination of food and water sources. Poor sanitation even contributes to about 700,000 child deaths from diarrhea each year.

Many waste disposal methods require the fecal matter be dehydrated prior to either burning the fecal matter or removing the fecal matter from the toilet or outhouse for cleanliness purposes. There is also a lack of fecal matter dehydration systems that are transportable and viable without an external power supply.

Thus, a need exists for a fecal matter dehydration system that is transportable, efficient, and clean.

SUMMARY

Various implementations include a biomass dehydration system. The system includes a wet biomass chamber, a belt with cavities or a chain, two or more pulleys, and a drying chamber. The wet biomass chamber is for containing wet biomass. The belt or chain has a length and defines one or more cavities. The two or more pulleys include at least a drive pulley. The belt or chain extends along the length around the two or more pulleys. The drive pulley positively engages the belt or chain such that rotation of the drive pulley causes the belt or chain to move around the two or more pulleys in a drive direction along the length. The two or more pulleys are configured such that the one or more cavities are disposable within the wet biomass chamber as the belt or chain moves along the two or more pulleys to cause wet biomass contained within the wet biomass chamber to enter the one or more cavities. The drying chamber is for dehydrating wet biomass disposed in the one or more cavities such that wet biomass disposed in the one or more cavities converts into solid fuel pellets. At least a portion of the belt or chain extends in the drive direction from the wet biomass chamber through the drying chamber. One of the two or more pulleys includes one or more ejection protrusions for engaging the one or more cavities and ejecting solid fuel pellets disposed within the one or more cavities from the one or more cavities.

In some implementations, the system further includes a fan for causing air to flow through the drying chamber. In some implementations, the fan causes ambient temperature air to flow through the drying chamber.

In some implementations, the system further includes a heat source for heating air within the drying chamber. In some implementations, the heat source is combustion gases from combustion of solid fuel pellets.

In some implementations, one of the two or more pulleys is a sprocket.

In some implementations, at least a portion of two pulleys are disposed within the wet biomass chamber.

In some implementations, the wet biomass chamber defines an inlet port for introducing wet biomass into the wet biomass chamber.

In some implementations, the belt or chain comprises a drive chain. In some implementations, the drive chain comprises a roller chain.

In some implementations, the belt or chain comprises a corrosion-resistant material. In some implementations, the corrosion-resistant material comprises stainless steel. In some implementations, the corrosion-resistant material comprises a polymer.

In some implementations, the system further includes at least one wiper for removing from the belt or chain wet biomass disposed externally from the one or more cavities.

In some implementations, the system further includes at least one wiper for compressing wet biomass into the cavities. In some implementations, the at least one wiper comprises a resilient flap in contact with the belt or chain.

In some implementations, the system further includes a compactor disposed within the wet biomass chamber. In some implementations, the compactor causes wet biomass disposed within the wet biomass chamber to enter the one or more cavities. In some implementations, the compacter comprises a compacter ramp having a first portion and a second portion spaced apart in the drive direction from the first portion. In some implementations, the second portion of the compactor is closer than the first portion of the compactor to the belt or chain.

In some implementations, the system further includes a wicking material disposed at least partially within the wet biomass chamber for drawing moisture out of wet biomass disposed within the wet biomass chamber.

In some implementations, the system further includes a solar panel.

In some implementations, one of the one or more cavities of the belt or chain moves from the wet biomass chamber to the one of the two or more pulleys in 12 hours or more.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods disclosed herein provide for a biomass dehydration system that converts wet biomass into dehydrated solid fuel pellets for combustion. The biomass dehydration system includes a system of pulleys and a belt or chain that define cavities. At least a portion of one of the pulleys is disposed within a wet biomass chamber such that when the belt or chain extends around the portions of one of the pulleys that are disposed within the wet biomass chamber, the cavities of the belt or chain fill with wet biomass. After the chain or belt has rotated out of the wet biomass chamber and into the drying chamber, the wet biomass is dehydrated and converted into solid fuel pellets by a fan and air inlets. The chain or belt is rotated at a slow enough speed such that the wet biomass within the cavities of the chain or belt can be dehydrated without a heat source. One of the other pulleys includes ejector protrusions that force the solid fuel pellets out of the cavities of the belt or chain. The biomass dehydration system can be powered by a solar panel such that it is transportable and is not reliant on an external power supply.

Various implementations include a biomass dehydration system. The system includes a wet biomass chamber, a belt or chain, two or more pulleys, and a drying chamber. The wet biomass chamber is for containing wet biomass. The belt or chain has a length and defines one or more cavities. The two or more pulleys include at least a drive pulley. The belt or chain extends along the length around the two or more pulleys. The drive pulley positively engages the belt or chain such that rotation of the drive pulley causes the belt or chain to move around the two or more pulleys in a drive direction along the length. The two or more pulleys are configured such that the one or more cavities are disposable within the wet biomass chamber as the belt or chain moves along the two or more pulleys to cause wet biomass contained within the wet biomass chamber to enter the one or more cavities. The drying chamber is for dehydrating wet biomass disposed in the one or more cavities such that wet biomass disposed in the one or more cavities converts into solid fuel pellets. At least a portion of the belt or chain extends in the drive direction from the wet biomass chamber through the drying chamber. One of the two or more pulleys includes one or more ejection protrusions for engaging the one or more cavities and ejecting solid fuel pellets disposed within the one or more cavities from the one or more cavities.

Figure 1:
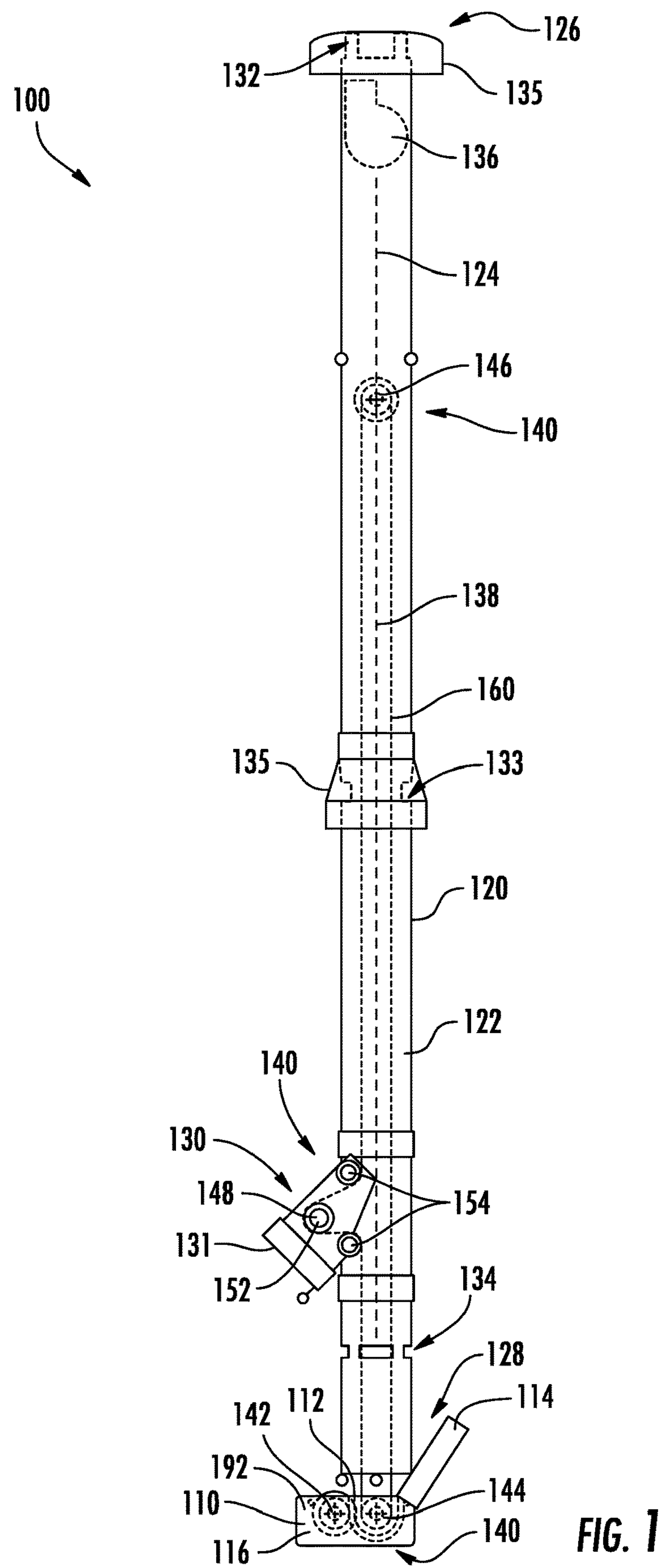
FIG. 1 is a side view of a biomass dehydration system, according to one implementation.
Figure 2:
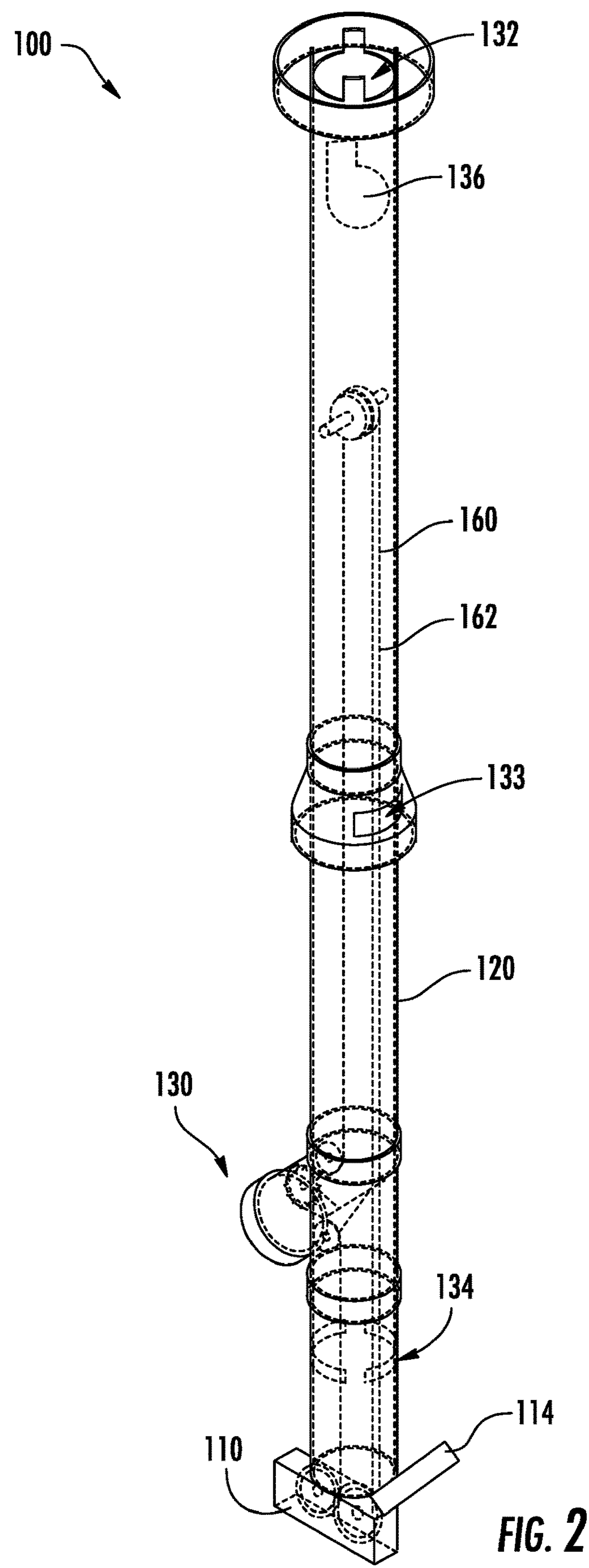
FIG. 2 is a perspective view of the biomass dehydration system of FIG. 1.

The biomass dehydration system 100, as shown in FIG. 1, includes a wet biomass chamber 110, a drying chamber 120, six pulleys 140, and a chain 160.

The wet biomass chamber 110 contains the wet biomass 192 prior to dehydration. The wet biomass chamber 110 defines at least one opening 112 and an inlet port 114 for introducing wet biomass 192 into the wet biomass chamber 110. The wet biomass chamber 110 can be any three dimensional shape capable of holding and collecting solids and liquids. The inlet port 114 is in communication with a toilet (not shown). Although, in other implementations, the inlet port is in communication with an outhouse, cathole, or any other source of biomass fuel. In other implementations, the wet biomass chamber includes multiple inlet ports and multiple openings.

The drying chamber 120 is a hollow section with an inner surface 122, a longitudinal axis 124, a first end 126, and a second end 128 opposite and spaced apart from the first end 126 along the longitudinal axis 124. The second end 128 of the drying chamber 120 is coupled to and in communication with the opening 112 of the wet biomass chamber 110. The drying chamber 120 includes a chute 130 disposed between the first end 126 and the second end 128 of the drying chamber 120. The chute 130 includes a chute outlet 131 that is in fluid communication with the drying chamber 120.

The six pulleys 140 include a first biomass chamber pulley 142, a second biomass chamber pulley 144, an upper pulley 146, a drive pulley 148, and two chute pulleys 150.

Figure 3:
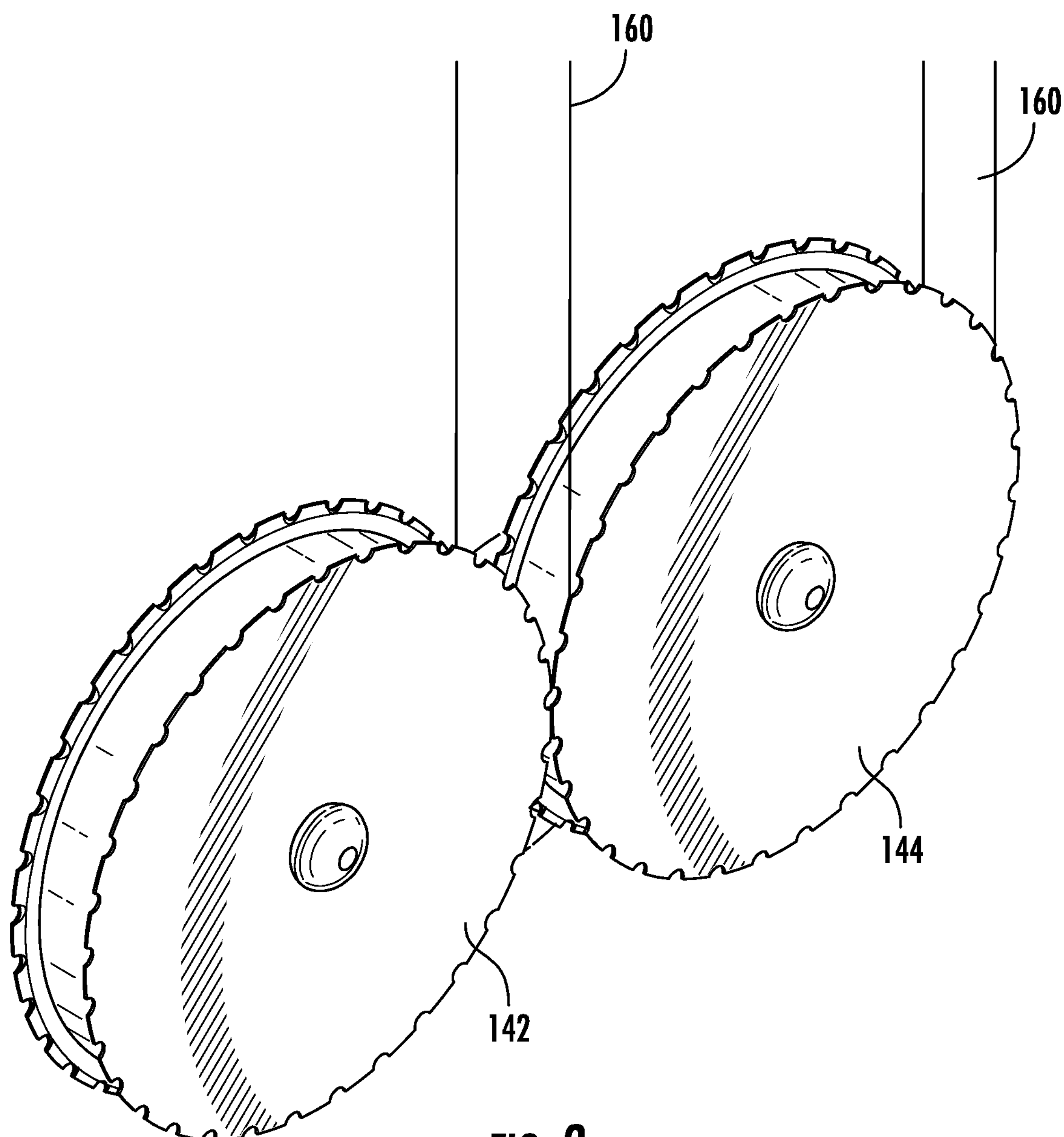
FIG. 3 is a perspective detail view of the biomass chamber pulleys of the biomass dehydration system of FIG. 1, according to one implementation.

The first and second biomass chamber pulleys 142, 144 are shown in FIG. 3. At least a portion of both biomass chamber pulleys 142, 144 are disposed within the wet biomass chamber 110 such that the biomass chamber pulleys 142, 144 are disposed adjacent each other and the opening 112 of the wet biomass chamber 110. The second biomass chamber pulley 144 is disposed along the longitudinal axis 124 of the drying chamber 120.

The upper pulley 146 is disposed within the drying chamber 120 adjacent the first end 126 of the drying chamber 120. The upper pulley 146 is spaced apart from the second biomass chamber pulley 144 along the longitudinal axis 124 of the drying chamber 120.

Figure 4:
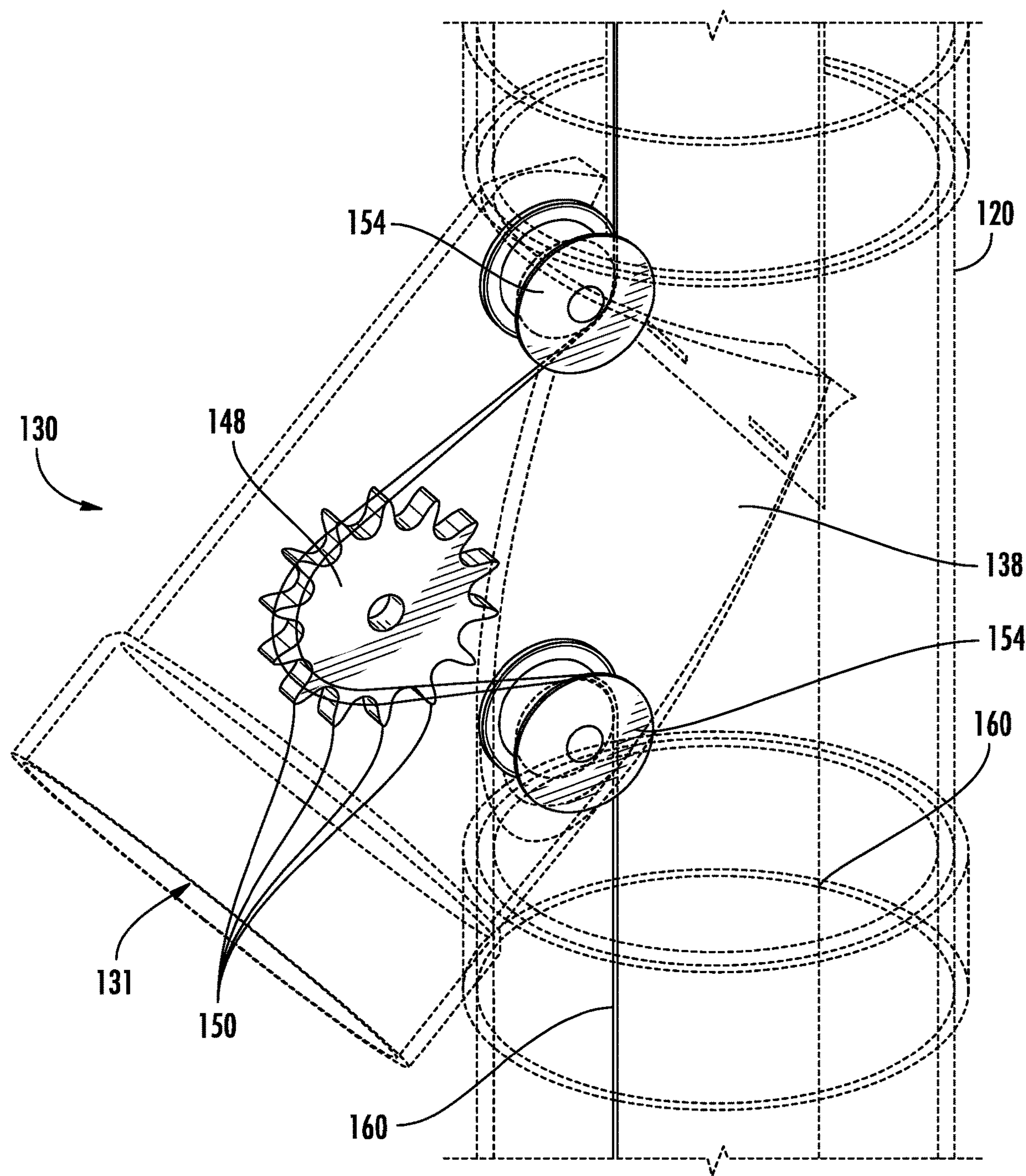
FIG. 4 is a perspective detail view of the chute pulleys and drive pulley of the biomass dehydration system of FIG. 1, according to one implementation.

The drive pulley 148 is a sprocket disposed within the chute 130 of the drying chamber 120. The drive pulley 148 includes multiple ejection protrusions 150 that positively engage the chain 160, as discussed below. The chute pulleys 154 are located opposite each other on either side of the drive pulley 148 and disposed partially within the chute 130 of the drying chamber 120. The drive pulley 148 and the two chute pulleys 154 are shown in a detailed view in FIG. 4.

A motor 152 is coupled to the drive pulley 148 and is configured to rotate the drive pulley 148. A solar panel (not shown) is disposed external to the system 100 and is configured to provide power to the motor 152 such that the biomass dehydration system 100 is transportable and not reliant on an external power supply.

The chain 160 has a chain length 162 and defines multiple cavities 164. The chain 160 is disposed within the drying chamber 120 and wet biomass chamber 110 such that the chain 160 extends around the drive pulley 148, chute pulleys 154, upper pulley 146, and second biomass chamber pulley 144. The chain 160 shown in FIGS. 1-5 is a roller chain that defines multiple cavities 164, but in other implementations, the chain can be any kind of drive chain that defines one or more cavities. The chain 160 shown in FIGS. 1-5 includes stainless steel, but in other implementations, the chain includes steel, aluminum, a polymer, polypropylene, any corrosion-resistant material, or any combination thereof.

Although the system 100 shown in FIGS. 1-5 includes six pulleys 140, in other implementations, the wet biomass chamber includes two pulleys, three pulleys, four pulleys, or any number of pulleys located in any arrangement such that at least one of the pulleys is a drive pulley, at least one pulley causes a portion of the chain to extend into the wet biomass chamber, and the pulleys cause the chain to extend through the drying chamber. Although the system 100 shown in FIGS. 1-5 includes six pulleys 140 and one chain 160, in other implementations, the system includes additional pulleys and any number of chains extending around the additional pulleys such that multiple chains extend parallel relative to each other. This implementation allows for multiple chains within a system to simultaneously dry and produce solid fuel pellets using the same wet biomass chamber, drying chamber, chute, and motor to rotate the drive pulleys.

Figure 7:
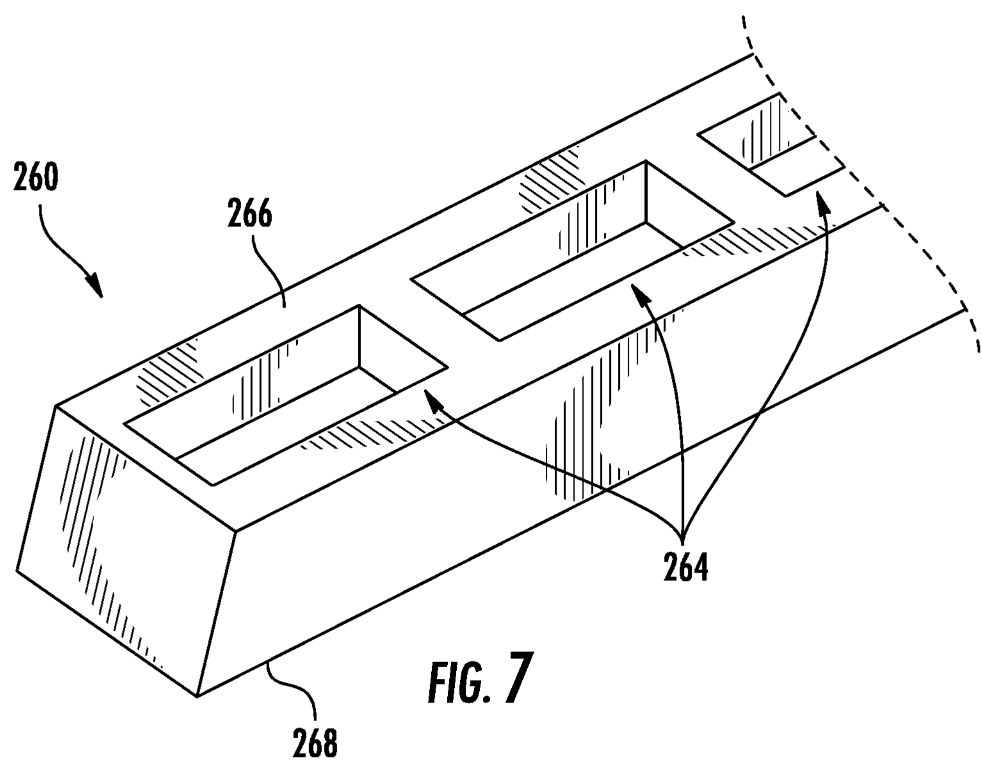
FIG. 7 is a perspective detail view of a belt, according to one implementation.

In other implementation, a belt 260 as shown in FIG. 7 can be included in the system instead of a chain such that the belt 260 extends around the pulleys 140. The belt 260 in FIG. 7 has a first side 266 and a second side 268 opposite and spaced apart from the first side 266. The first side 266 of the belt 260 defines multiple cavities 264 that extend partially through a portion of the belt 260 such that the ejector protrusions 150 of the drive pulley 148 can contact the second side 268 of the belt 260 to cause the cavities 264 to resiliently deform. The deformation of the cavities 264 forces the dry solid fuel pellets 194 disposed within the cavities 264 to exit the cavities 264. Although the belt 260 shown in FIG. 7 includes a resilient polymer, in other implementations, the belt includes a polyester mesh or any other resilient material capable of defining at least one cavity.

Because the ejection protrusions 150 of the drive pulley 148 engage the cavities 164 of the chain 160, rotation of the drive pulley 148 causes the chain 160 to move around the chute pulleys 154, upper pulley 146, and second biomass chamber pulley 144 in a counterclockwise drive direction as viewed in FIG. 1. Because the first and second biomass chamber pulleys 142, 144 are partially disposed within the wet biomass chamber 110, when the chain 160 moves along the second biomass pulley 144, one or more of the multiple cavities 164 of the chain 160 are disposed within the wet biomass chamber 110 between the first biomass pulley 142 and the second biomass pulley 144. As the chain 160 moves through the wet biomass chamber 110, the two biomass pulleys 142, 144 force wet biomass 192 to enter one or more cavities 164 of the chain 160 that are disposed within the wet biomass chamber 110. As the wet biomass 192 within the one or more cavities 164 of the chain 160 travels along the drying chamber 120 from the second wet biomass pulley 144, to the upper pulley 146, and to the chute pulleys 154, the wet biomass 192 dehydrates such that the wet biomass 192 within the one or more cavities 164 of the chain 160 converts into solid fuel pellets 194 within the one or more cavities 164 of the chain 160. The amount of time that it takes for the wet biomass 192 disposed in the one or more cavities 164 of the chain 160 to convert into solid fuel pellets 194 can vary based on ambient air conditions such as temperature and relative humidity and based on the starting water content of the wet biomass. The wet biomass 192 in FIGS. 1-5 includes feces containing about 85 percent or less water by mass.

In the biomass dehydration system 100 of FIGS. 1-5, a cavity 164 of the chain 160 moves from the wet biomass chamber 110 to the drive pulley 148 in twelve hours or more. Also, in other implementations, such as the implementation with a heat source 370 as shown in FIG. 6, one or more of the cavities 364 of the chain 360 moves from the wet biomass chamber 310 to the drive pulley 348 in six hours or more. In other implementations, one of more of the cavities of the chain moves from the wet biomass chamber to the drive pulley in under six hours.

To dry out the wet biomass 192 as it travels along the drying chamber 120, the drying chamber 120 defines three sets of air inlets 132, 133, 134 and further includes a fan 136 and an internal baffle 138. A first set of air inlets 132 is defined adjacent the first end 126 of the drying chamber 120, a second set of air inlets 133 is defined between the first end 126 and the chute 130 of the drying chamber 120, and a third set of air inlets 134 is defined adjacent the chute 130 of the drying chamber 120. The air inlets 132, 133, 134 provide ventilation throughout the drying chamber 120 by allowing ambient temperature air to flow through the drying chamber 120. The first set of air inlets 132 and the second set of air inlets 133 include air inlet covers 135 that are configured to prevent rainwater or external fluids from entering the drying chamber 120.

In other implementations, the drying chamber defines one, two, three, four, or any number of air inlets or air inlet sets. In further implementations, the drying chamber includes any number of air inlet covers or does not include any air inlet covers.

The fan 136 is fixedly attached to the first end 126 of the drying chamber 120 and is in fluid communication with the drying chamber 120 and the multiple air inlets 132, 133, 134 of the drying chamber 120. The fan 136 is configured to create a pressure differential that causes air to flow through the air inlets 132, 133, 134 and through the drying chamber 120 to further dehydrate the wet biomass 192 disposed within the one or more cavities 164 of the chain 160 such that the wet biomass 192 disposed within the one or more cavities 164 of the chain 160 is converted into solid fuel pellets 194. The rotational speed of the chain 160 and the flow of air through the drying chamber 120 cause the wet biomass 192 to dehydrate into solid fuel pellets 194 before the wet biomass 192 reaches the drive pulley 148 with the ejector protrusions 150 so that the ejector protrusions 150 will be able to force the solid fuel pellets 194 out of the cavities 164.

Figure 5:
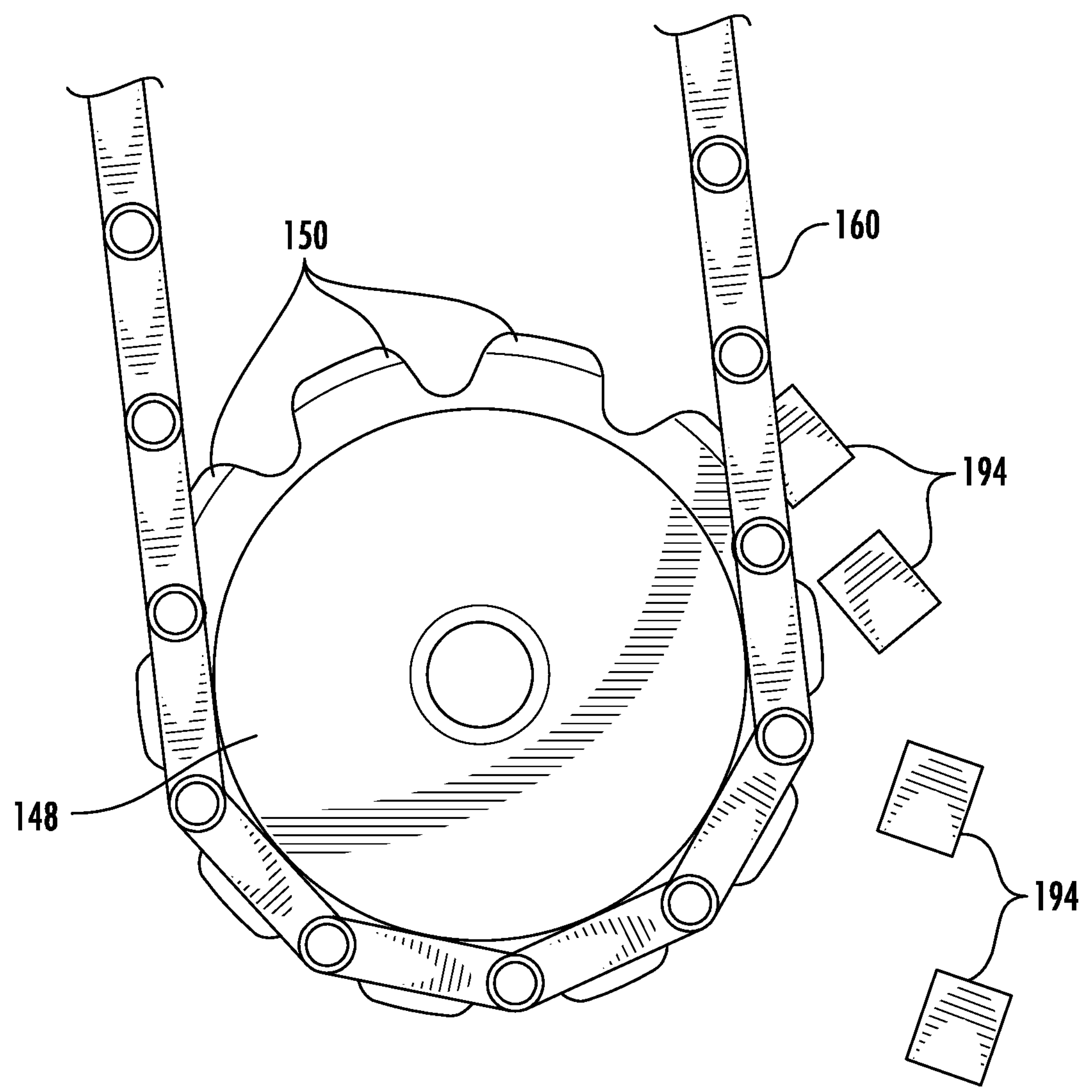
FIG. 5 is a side detail view of the drive pulley of the biomass dehydration system of FIG. 1, according to one implementation.
Figure 6:
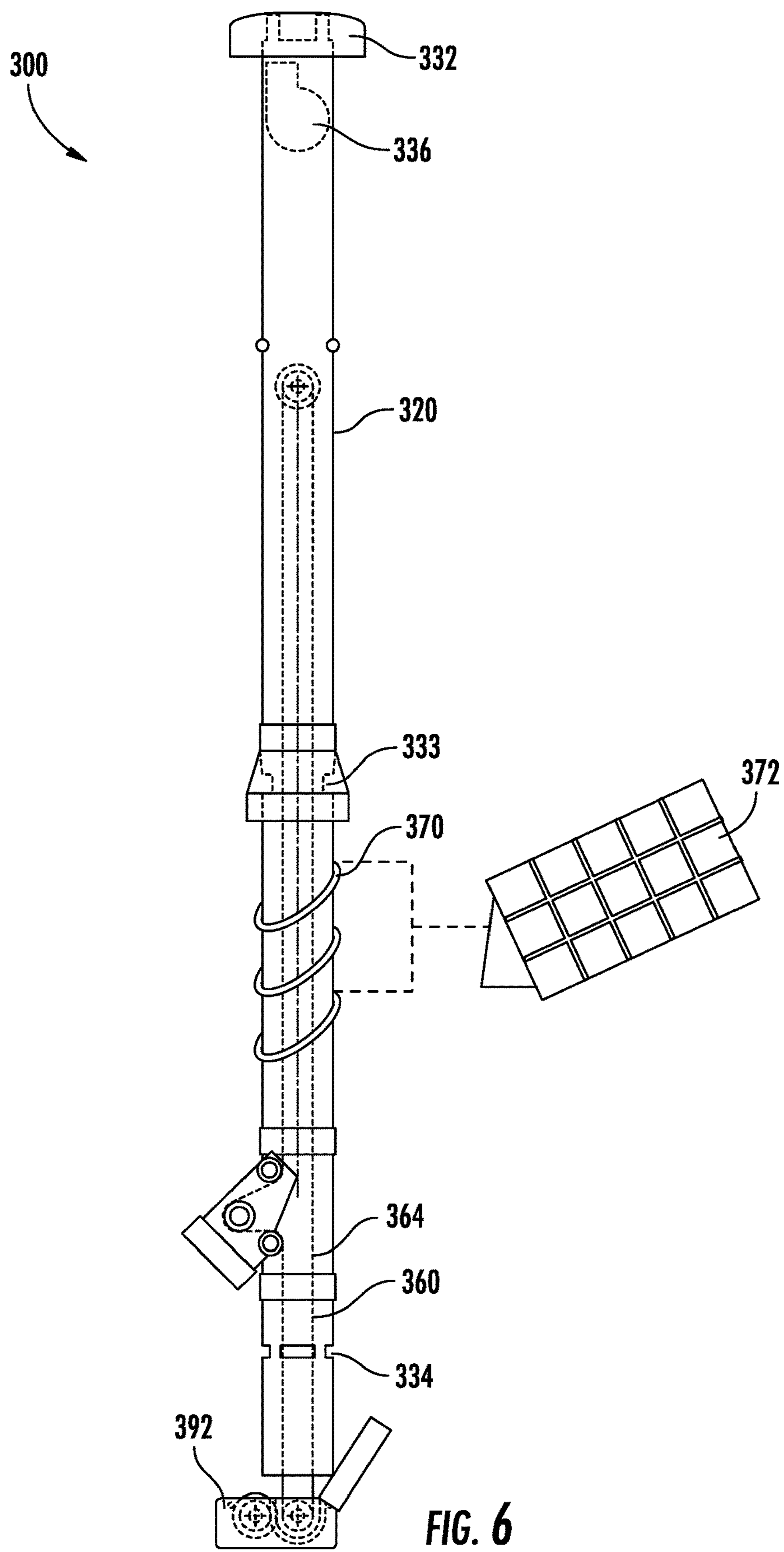
FIG. 6 is a side view of a biomass dehydration system, according to another implementation.

As shown in FIG. 5, the ejector protrusions 150 are positively engageable with the cavities 164 of the chain 160 such that when the cavities 164 containing solid fuel pellets 194 reach the drive pulley 148, the ejector protrusions 150 are inserted into and displace the solid fuel pellets 194 within the cavities 164, causing the solid fuel pellets 194 to exit the cavities 164. The chute 130 and chute outlet 131 are oriented below the drive pulley 148 such that the solid fuel pellets 194 fall down the chute 130 and out of the chute outlet 131 after being forced out of the cavities 164 of the chain 160 by the ejector protrusions 150.

The internal baffle 138 is fixedly attached to the inner surface 122 of the drying chamber 120 and the chute outlet 131. The internal baffle 138 is configured to separate the dehydrated solid fuel pellets 194 and wet biomass 192 as well as funnel any solid fuel pellets 194 that dislodge from the chain 160 between the upper pulley 146 and the drive pulley 148 into the chute 130. Although the internal baffle 138 in FIGS. 1-5 is stainless steel, in other implementations, the internal baffle is any corrosion-resistant material, a moisture wicking fabric, or any material that is capable of effectively dividing the drying chamber such that solid fuel pellets will not fall back into the wet biomass chamber.

To further control the humidity of the drying chamber 120 and facilitate the drying of the wet biomass 192, the wet biomass chamber 110 includes a wicking material 116 disposed at least partially within the wet biomass chamber 110 for drawing moisture out of the wet biomass 192 disposed within the wet biomass chamber 110. In FIGS. 1-5, the wicking material 116 is polyester, but in other implementations, the wicking material is nylon, cotton, or any material capable of drawing moisture out of the wet biomass disposed within the wet biomass chamber.

In another implementation as shown in FIG. 6, the biomass dehydration system 300 further includes a heat source 370 for heating the air within the drying chamber 320. The heat source 370 in FIG. 6 is an electric resistance element powered by the solar panel 372 that is configured to provide energy to a portion of the drying chamber 320 to dry out wet biomass 392 disposed in the cavities 364 of the chain 360 in addition to the fan 336 and sets of air inlets 332, 333, 334. In other implementations, the heat source is combustion gases from combustion of solid fuel pellets.

Figure 8:
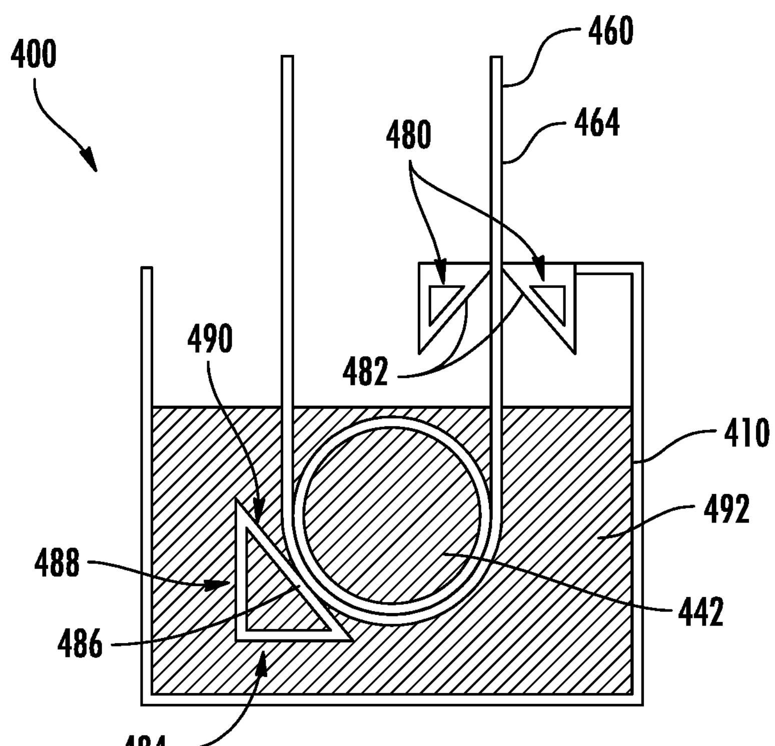
FIG. 8 is a side detail view of a biomass dehydration system, according to yet another implementation.

In other implementations, and as shown in FIG. 8, the biomass dehydration system 400 includes two wipers 480, a compactor 484, and one biomass chamber pulley 442.

The two wipers 480 are disposed along the chain 460 at a location after the chain 460 exits the wet biomass chamber 410. The two wipers 480 each include resilient flaps 482 configured to contact opposite surfaces of the chain 460. The two wipers 480 are oriented at an angle relative to the opposite surfaces of the chain 460 to compact the wet biomass 492 into the cavities 464 and remove any wet biomass 492 disposed externally from the cavities 464 on the chain 460.

The compactor 484 includes a compactor ramp 486 having a first portion 488 and a second portion 490 disposed closer than the first portion 488 to the chain 460. The compactor 484 is disposed within the wet biomass chamber 410, and the angle of the compactor 410 relative to the chain 460 causes wet biomass 492 within the wet biomass chamber 410 to enter the cavities 464 of the chain 460.

In other implementations, the biomass dehydration system includes more than one compactor, or no compactors. Also, in other implementations, the biomass dehydration system includes one wiper, three wipers, any number of wipes, or no wipers for passive cavity filling of the cavities of the chain. In other implementations, the aforementioned combinations of compactor and wipers are combined with a belt instead of a chain.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A biomass dehydration system, the system comprising:

a wet biomass chamber for containing wet biomass;

a belt or chain having a length and defining one or more cavities;

two or more pulleys including at least a drive pulley, wherein the belt or chain extends along the length around the two or more pulleys, wherein the drive pulley positively engages the belt or chain such that rotation of the drive pulley causes the belt or chain to move around the two or more pulleys in a drive direction along the length, wherein the two or more pulleys are configured such that the one or more cavities are disposable within the wet biomass chamber as the belt or chain moves along the two or more pulleys to cause wet biomass contained within the wet biomass chamber to enter the one or more cavities; and a drying chamber for dehydrating wet biomass disposed in the one or more cavities such that wet biomass disposed in the one or more cavities converts into solid fuel pellets, wherein at least a portion of the belt or chain extends in the drive direction from the wet biomass chamber through the drying chamber, wherein one of the two or more pulleys includes one or more ejection protrusions for engaging the one or more cavities and ejecting solid fuel pellets disposed within the one or more cavities from the one or more cavities.

2. The system of claim 1, further comprising a fan for causing air to flow through the drying chamber.

3. The system of claim 2, wherein the fan causes ambient temperature air to flow through the drying chamber.

4. The system of claim 1, further comprising a heat source for heating air within the drying chamber.

5. The system of claim 4, wherein the heat source is combustion gases from combustion of solid fuel pellets.

6. The system of claim 1, wherein the one of the two or more pulleys is a sprocket.

7. The system of claim 1, wherein at least a portion of two pulleys are disposed within the wet biomass chamber.

8. The system of claim 1, wherein the wet biomass chamber defines an inlet port for introducing wet biomass into the wet biomass chamber.

9. The system of claim 1, wherein the belt or chain comprises a drive chain.

10. The system of claim 9, wherein the drive chain comprises a roller chain.

11. The system of claim 1, wherein the belt or chain comprises a corrosion-resistant material.

12. The system of claim 11, wherein the corrosion-resistant material comprises stainless steel.

13. The system of claim 11, wherein the corrosion-resistant material comprises a polymer.

14. The system of claim 1, further comprising at least one wiper for removing from the belt or chain wet biomass disposed externally from the one or more cavities.

15. The system of claim 1, further comprising at least one wiper for compressing wet biomass into the cavities.

16. The system of claim 15, wherein the at least one wiper comprises a resilient flap in contact with the belt or chain.

17. The system of claim 1, further comprising a compactor disposed within the wet biomass chamber, wherein the compactor causes wet biomass disposed within the wet biomass chamber to enter the one or more cavities.

18. The system of claim 17, wherein the compacter comprises a compacter ramp having a first portion and a second portion spaced apart in the drive direction from the first portion, wherein the second portion is closer than the first portion to the belt or chain.

19. The system of claim 1, further comprising a wicking material disposed at least partially within the wet biomass chamber for drawing moisture out of wet biomass disposed within the wet biomass chamber.

20. The system of claim 1, further comprising a solar panel.

21. The system of claim 1, wherein one of the one or more cavities of the belt or chain moves from the wet biomass chamber to the one of the two or more pulleys in 12 hours or more.

* * * * *